Patented Feb. 20, 1945

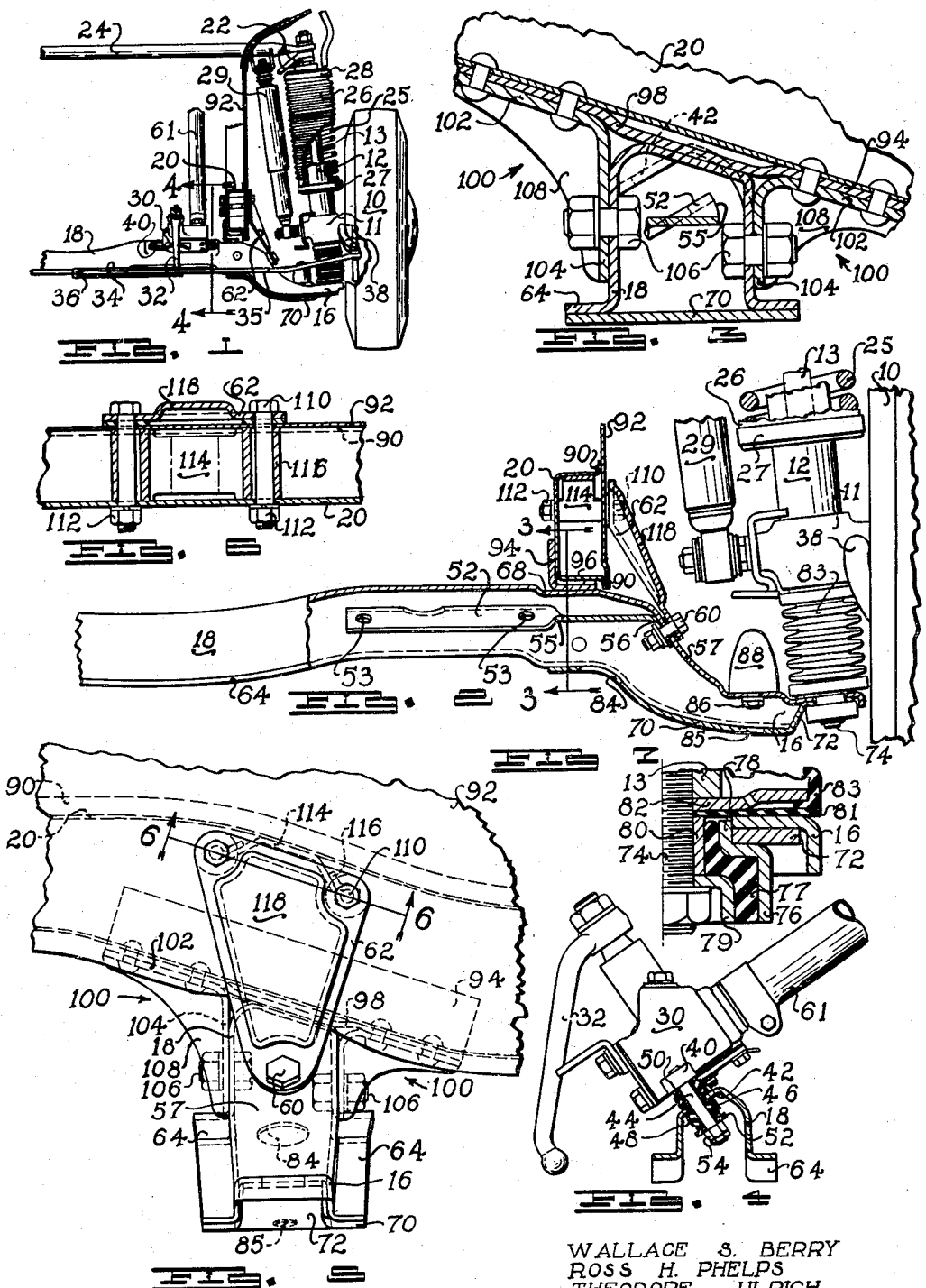

2,369,644

UNITED STATES PATENT OFFICE 2,369,644

STEERABLE ROAD WHEEL MOUNTING

Wallace S. Berry and Ross H. Phelps, Kenosha, and Theodore Ulrich, Milwaukee, Wis., assignors to Nash-Kelvinator Corporation, Kenosha, Wis., a corporation of Maryland Application December 3, 1941, Serial No. 421,440

10 Claims. (Cl. 280—96.2)

This invention relates to steerable road wheel mounting means and has particular reference to means for mounting the front wheels and steering mechanism of an automotive vehicle.

It is desirable to provide automobiles with steering mechanism and wheel mounting means which are sufficiently rigid so that any movement of the steering wheel results in immediate and corresponding movement of the steerable road wheels. It is also desirable to provide insulation between the road wheels and the body and steering wheel which will prevent vibrations in the road wheels from reaching the steering wheel. However, any deformation in the mounting means of the road wheels and steering gear or in the insulating material is liable to cause undesirable steering motion in the wheels and permit what is known as shimmy, wheel wobble and sloppy steering.

It is therefore an object of this invention to provide means for mounting the front wheels of an automobile so that as little vibration as possible is transmitted to the steering gear and body of the automobile.

It is another object of this invention to provide means for mounting the front wheels and steering gear of an automobile in such a manner that the steering linkage will be rigid enough to prevent shimmy, wobble and other steering faults in the wheel without at the same time being so tight as to transmit vibration to the steering wheel.

It is another object of this invention to provide means for mounting the front wheels and steering gear of an automobile which will compensate for such minor variations in the mounting positions of the parts as occur in ordinary manufacturing practice.

It is another object of this invention to provide means for bracing a steering gear which is yieldably mounted on a cross member so that while the steering gear is insulated from the cross member, it will not wobble and impart objectionable and unintentional steering forces to the front wheels.

It is another object of this invention to provide means for strengthening the connection between the body of an automobile and the wheel carrying member to prevent twisting of the member relative to the body.

It is another object of this invention to provide means for strengthening a wheel carrying cross member to prevent deflection in the member and the resulting movement of the wheel mounting mechanism relative to the body and steering gear of the automobile.

It is another object of this invention to provide a cross member on which a rigid king pin may be mounted in such a manner as to be effectively insulated therefrom.

Other objects and advantages of this invention will be apparent from a consideration of the following specification and claims and the attached drawing, of which there is one sheet, and in which—

Figure 1 represents a front elevation of a steerable road wheel with its supporting cross member attached to the body of an automobile, the body parts being shown in cross section;

Figure 2 represents a vertical, transverse, sectional view through the cross member shown in Figure 1;

Figure 3 represents a sectional view taken along a plane indicated by the line 3—3 in Figure 2 and looking in the direction of the arrows;

Figure 4 represents a longitudinal sectional view through the cross member illustrated in Figures 1 and 2 taken along a plane indicated by the line 4—4 and looking in the direction of the arrows;

Figure 5 represents a side elevational view of the cross member and body connection, the road wheel and wheel mounting mechanism being omitted to more clearly show the construction;

Figure 6 represents a sectional view taken along a plane indicated by the line 6—6 in Figure 5 and looking in the direction of the arrows; and Figure 7 represents an enlarged sectional view showing the connection between the lower end of the wheel supporting king pin and the cross member.

Illustrated in Figure 1 is a road wheel 10 which is rotatably mounted on a knuckle 11 which is in turn rigidly secured to a sleeve 12. The sleeve 12 is rotatable about and slideable along a rigid king pin 13 which is telescopically positioned within the sleeve. The lower end of the king pin (see Figure 7) is secured to the outer end 16 of a rigid cross member 18 which is rigidly attached to the side rail member 20 of an automobile body. The upper end of the king pin is braced to the automobile body by a pair of brace rods 22 and to a similar king pin on the opposite side of the automobile by a cross brace rod 24. A coil spring 25 is enclosed by the rubber bellows 26 and positioned between a lower spring seat 27 mounted on the sleeve 12 and an upper spring seat 28 mounted on the upper end of the king pin to yieldingly support the weight of the body on the sleeve 12 and wheel 10. A strut type shock absorber 29 has its opposite ends connected to the cross brace rod 24 and the steering knuckle 11 to further cushion the body on the wheel. The construction of the king pin, bracing means, sleeve, knuckle and spring is more particularly described and claimed in the co-pending application of Nils Erik Wahlberg, Floyd F. Kishline and Wallace S. Berry for an Automotive suspension, Serial No. 370,286, filed December 16, 1940, Patent No. 2,325,894, dated August 3, 1943.

Mounted on the cross member 18 just inside of the side rail member 20 is a steering gear 30 provided with a pitman arm 32. The pitman arm 32 is connected in the usual fashion to a drag link 34 which extends to the wheel on the right side of the vehicle (not shown). A second drag link 35 is connected at 36 to the first drag link 34 and extends to the steering arm 38 connected to the steering knuckle 12 to rotate the steering knuckle about the king pin when moved by the pitman arm.

The connection between the steering gear 30 and the cross member 18 is more specifically shown in Figure 4 which illustrates the steering gear 30 as provided with a pair of ears 40 extending transversely on each side of the steering gear. The cross member 18 is provided with a sloping surface at 42 which defines apertures through which stud bolts 44 are extended into holes tapped in the ears 40. Rubber or other deformable grommets 46 are positioned around the bolts 44 on the top and bottom side of the sloping surface 42 to prevent the transmission of vibration from the cross member to the steering gear 30. The rubber grommets 46 are retained within flanged metallic cup members 48 which prevent the surfaces of the cross member 18 from abrading the grommets and which center the grommets in the apertures in the cross member. Flanged metal sleeves 50 are provided in the center of the grommets to prevent the bolts 44 from abrading the inside of the rubber. The above construction of the steering gear mounting means is more particularly described and claimed in the co-pending application of Wallace S. Berry for a Steering gear, Serial No. 387,997, filed April 11, 1941, Patent No. 2,344,848, dated March 21, 1944.

In addition to the above described mounting means, this invention provides a transverse brace rod 52 defining apertures 53 through which the bolts 44 extend and which is positioned between the lower grommets 46 and the nuts 54 which compress the grommets and clamp the steering gear 30 to the cross member 18. The plane of the inner end surface of the brace rod 52 is approximately normal to the bolts 44 and is twisted at 55 (see Figure 2) and extended to the bent down outer end 56 which is adjacent to the downturned end portion 57 of the cross member 18. The bent down end 56 is apertured and secured to the cross member by the bolt 60. The bolt 60 is passed through the wall of the cross member and a triangular brace 62 connected to the side rail 20 in a manner which will be more particularly described later.

The method of mounting the steering gear 30 on the cross member by means of the rubber grommets 46 permits the steering gear to assume various positions relative to the cross member and to thus compensate for errors in locating the cross member on the side rail and errors in forming the sloping surface 42 of the cross member. Thus the steering column 61 may assume the proper angle regardless of errors in mounting the cross member and will be insulated therefrom. However, it has been found that the rubber grommets, when used alone, permit an undesirable transverse vibration of the steering gear relative to the cross member when in use, which vibration imparts undesired and unintended movement to the Pitman arm 32 and the steering links 34, 36, and 38, thus imparting an unintended turning force on the road wheel 10. It has further been found that the transverse brace 52 eliminates this vibration of the steering gear without interfering with the sound insulating properties of the steering gear mount.

Considering the construction of the cross member 18 more particularly, it will be noted that the cross member is of downwardly opening, channel shaped cross section having outwardly turned flanges 64 along the bottom edge thereof. The outer ends of the cross member are turned downwardly as at 57 and horizontally outwardly as at 16, the channel section decreasing in depth toward the outer ends of the cross member. A shallow downwardly offset portion is also provided at 68 between the center section of the cross member and the downturned end 56 just underneath the side rail 20 of the body (see Figure 2).

Due to the decreased depth of the channel section at the ends of the cross member, a reinforcing or closure plate 70 is secured as by welding to the underside of the flanges 64 along the ends of the cross member. At the outer end of the cross member the reinforcing plate 70 is formed with a narrow portion 72 bent sharply upwardly to the underside of the top wall of the cross member so as to provide a double thickness of metal which is apertured to pass the cap screw 74 to secure the lower end of the king pin 13 to the cross member (see Figure 7).

The cap screw 74 extends through an inverted cup shaped member 76 which has rubber 77 bonded therein. An annular flange 78 on the bottom of the cup member fits within the aperture in the end 16 of the cross member and keeps the cup member properly centered. The head of the cap screw 74 is recessed in an inner cup member 79 and a spacer sleeve 80 bears against a flat rubber washer 81 and dished metal washer 82 positioned around the screw 74 between the top of the cross member and the bottom of the king pin 13. The inner cup member 79 and sleeve 80 prevent the screw 74 from abrading the rubber and limit the distance the screw may be turned into the king pin. The lower edge of a rubber bellows 83 is retained between the outer edges of the dished washer 82 and the rubber washer 81.

The above construction permits the length of the annular flange 78 to be considerably increased over that shown in the above mentioned application of Nils Erik Wahlberg, Floyd F. Kishline and Wallace S. Berry so that the outer cup 76 is less liable to slip and also increases the rigidity of the outer ends of the cross member 18. The reinforcing plate 70 is also provided with apertures 84 and 85 through which tools may be passed to reach the underside of the bolt 60 and the nut 86 which is used to secure a rubber bumper 88 to the upper side of the cross member.

Considering in greater detail the manner in which the cross member 18 is secured to the body of the automobile, attention is called to the fact that the side rail member 20 of the body consists of an outwardly opening, channel shaped member with vertically turned flanges 90 along the outer edges thereof. The channel shaped side rail 20 is closed and formed into a box section by the lower edge of the wheel house panel 92 which is welded thereto. In order that the lower edge of the wheel house panel 92 and the lower flange 90 on the side rail may clear the upper surface of the cross member 18, a reinforcing plate 94 of angular shaped cross section is secured along the lower inside edge of the side rail 20. The lower flange 96 of the reinforcing plate is offset downwardly as at 98 (see Figures 3 and 5) so as to be flush with the edge of the lower flange 90. The downwardly bent portion 98 will thus rest on the upper surface of the cross member 18 and prevent the lower flange 90 of the side rail from striking the cross member. The reinforcing plate 94 also serves to distribute the load of the cross member over a considerable area of the side rail so that no localized stresses are developed in the side rail. This latter feature is of particular advantage since it permits lighter gauge material to be used in the side rail which would otherwise be crushed by the concentrated load of the cross member applied directly to the side rail.

On each side of the offset portion 98 the side rail 20 is provided with angular brackets 100 having upper legs 102 riveted to the underside of the reinforcing plate 94 and the side rail 20 and spaced vertical legs 104 which are apertured to pass the bolts 106 by means of which the cross member 18 is removably secured to the side rails. Generally triangular flanges 108 are provided on the brackets 100 to increase their rigidity.

The triangular brace plates 62 which brace the downturned end portions 57 of the cross member 18 with respect to the side rails 20, are secured to the outside of the wheel house panel 92 by means of the bolts 110 which extend through the hollow channel section of the side rail 20 and are secured by nuts 112. A generally U-shaped band 114 has its base welded to the underside of the upper flange of the channel member 20 and is provided with return bend portions 116 at its ends which form sleeves through which the bolts 110 extend. The sleeves thus formed prevent the hollow box section formed by the side rail 20 and wheel house panel 92 from collapsing under the load imposed by tightening the nuts 112. The triangular brace 62 is provided with an outwardly pressed reinforcing rib 118 to increase its rigidity.

It should thus be apparent that we have provided a means for rigidly mounting a cross member on the side rail of an automobile and for reinforcing the free ends of a cross member so that they will support a wheel suspension system without deflection. We have also provided means for insulating the wheel suspension system from the cross member without sacrificing the stability of the system on the cross member and we have provided means for mounting the steering gear on the cross member in such a manner that it is insulated from the cross member and adjustable within limits while at the same time being braced relative to the cross member to prevent undesirable steering forces from being imparted to the road wheel. The whole structure results in a wheel mounting structure which is both quiet and stable.

While we have described our invention in some detail, we intend this description to be an example only and not as a limitation of our invention to which we make the following claims:

1. Means for mounting steerable road wheels and steering mechanism on a vehicle having side rails comprising a cross member having a downwardly opening, channel shaped cross section, reinforcing members positioned between said cross member and said side rails and distributing the load of said cross member along a considerable portion of the length of said side rails, closure plates secured to said cross member near the ends thereof and forming a box section, the ends of said closure plates having a portion bent into contact with the underside of the ends of said cross member, king pins supported upon the ends of said cross member, means extending through the ends of said closure plates and the ends of said cross member for securing said king pins on said cross member, a steering gear positioned on said cross member, connecting means extending from said steering gear through said cross member, deformable cushioning means positioned around said connecting means on each side of said cross member, clamping means engageable with said connecting means for clamping said steering gear to said cross member, a rigid brace member extending from said clamping means on the opposite side of said cross member from said steering gear to a point on said cross member longitudinally offset from said steering gear, road wheels mounted on said king pins, and linkage connecting said road wheels to said steering gear.

2. Means for mounting steerable road wheels on a vehicle having side rails comprising, a cross member of channel shaped cross section, brace members connecting said cross member to said side rails and engaging said side rails over a greater length of the rail than the width of said cross member, closure plates secured to said cross member near the ends thereof and forming a box section, the ends of said closure plates being bent into contact with the web of said cross member, king pins secured to the ends of said cross member where said closure plates are in contact with the web of said cross member, a steering gear positioned on said cross member, connecting means extending through said cross member for clamping said steering gear to said cross member, deformable cushioning means positioned around said first mentioned means on each side of said cross member, a rigid brace member extending from said clamping means on the opposite side of said cross member from said steering gear to a point on said cross member laterally offset from said steering gear, road wheels mounted on said king pins, and linkage connecting said road wheels to said steering gear.

3. Means for mounting steerable road wheels on a vehicle having side rails comprising, a downwardly opening, channel shaped cross member, reinforcing brackets positioned on the top wall of said cross member and secured to said side rails along a surface extending to the front and rear of said cross member, closure plates secured to the bottom of said cross member near each end thereof, the outer ends of said closure plates being bent upwardly into contact with the top wall of said cross member and defining apertures, king pins positioned on the ends of said cross members and secured thereto by clamping means extending through said apertures, a steering gear positioned on the top of said cross member, clamping means extending from said steering gear through said cross member, deformable cushioning means positioned around said clamping means and insulating said clamping means and said steering gear from said cross member, a lateral brace rod extending from the lower end of said clamping means to a point on said cross member laterally offset from said steering gear, a laterally extending brace extending between said side rail and said cross member, a single means securing said brace rod and said brace means to said cross member, road wheels mounted on said king pins, and steering linkage connecting said wheels to said steering gear.

4. Steering mechanism for an automobile having a cross member of downwardly opening, channel shaped cross section with king pins secured to the outer ends thereof comprising, a sloping surface formed on said cross member defining apertures, a steering gear positioned over said surface, connecting members secured to said steering gear and extending through said apertures, deformable cushioning members positioned around said connecting members on each side of said surface, clamping members secured to said connecting members for compressing said cushion members and securing said steering gear to said cross member, and a laterally extending brace member extending between said connecting members and a point on said cross member laterally removed from said steering gear.

5. Steering mechanism for an automobile having a cross member of downwardly opening, channel shaped cross section with king pins secured to the outer ends thereof comprising, a sloping surface formed on said cross member defining an aperture, a steering gear positioned over said surface, a connecting member secured to said steering gear and extending through said aperture, deformable cushioning members positioned around said connecting members on each side of said surface and extending into said aperture, a clamping member secured to said connecting member for compressing said cushioning members and securing said steering gear to said cross member, and a laterally extending brace member extending between said connecting member and a point on said cross member laterally removed from said steering gear.

6. Steering mechanism for an automobile having a cross member comprising, a sloping surface formed on said cross member and defining an aperture, a steering gear positioned over said surface, a connecting member secured to said steering gear and extending through said aperture, deformable cushioning members positioned around said connecting member on each side of said cross member and extending into said aperture, a clamping member secured to said connecting member for compressing said cushioning members and securing said steering gear to said cross member, and a laterally extending brace member connecting between said connecting member and a point on said cross member laterally removed from said steering gear.

7. Steering mechanism for an automobile having a cross member of downwardly opening, channel shaped cross section with king pins mounted on each end thereof comprising, a sloping surface formed on said cross member defining a pair of apertures, a steering gear positioned over said surface and having means defining a second pair of apertures registering with said first apertures, bolts secured to said apertures in said steering gear and extending through said apertures in said cross member, deformable cushioning members positioned around said bolts on each side of said sloping surface and extending into the apertures in said surface, a transversely extending brace defining apertures positioned around said bolts, and clamping means for drawing said brace against the lower of said cushioning members and clamping said steering gear to said surface, said brace extending laterally to a point on said cross member removed from said steering gear, and means securing said brace to said cross member.

8. Means for mounting steerable road wheels on an automobile comprising, a cross member having a downwardly opening, channel shaped cross section, said cross member having its ends bent downwardly and then outwardly from said automobile, closure plates secured along the bottom of said cross member along the downwardly and outwardly bent portions thereof, the outer ends of said closure plates being bent upwardly into contact with the under surface of the top wall of said cross member and defining apertures, king pins resting on the ends of said cross member, and means extending through said apertures for securing said king pins to said cross member.

9. In combination with an automobile having a rigid cross member with king pins secured to the ends thereof, said cross member having a downwardly opening, channel shaped cross section with flanges turned outwardly along the lower edges thereof, closure plates secured to said flanges adjacent the ends of said cross member, the outer ends of said closure plates having a narrow portion bent upwardly within the channel section of said cross member and into contact with the under surface of the top wall of said cross member forming an end portion on said cross member of double thickness, said end portions defining apertures, and means extending through said apertures for securing said king pins to said cross member.

10. A reinforcing plate for connecting a side rail of an automobile to a cross member of the automobile comprising, an angle embracing a lower corner portion of said side rail, one leg of said angle being secured to the side of said side rail and the other leg of said angle having its end portions secured to the bottom of said side rail, and a center portion of said other flange being offset downwardly from said side rail and arranged to abut against and space said cross member from said side rail.

WALLACE S. BERRY.
ROSS H. PHELPS.
THEODORE ULRICH.